(12) United States Patent
Ayukawa

(10) Patent No.: US 10,597,084 B2
(45) Date of Patent: Mar. 24, 2020

(54) VEHICLE BODY LOWER SECTION STRUCTURE

(71) Applicant: TOYOTA JIDOSHA KABUSHIKI KAISHA, Toyota-shi, Aichi-ken (JP)

(72) Inventor: Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 16/008,654

(22) Filed: Jun. 14, 2018

(65) Prior Publication Data

US 2018/0370570 A1 Dec. 27, 2018

(30) Foreign Application Priority Data

Jun. 27, 2017 (JP) ................................. 2017-125067

(51) Int. Cl.
*B62D 21/15* (2006.01)
*B62D 25/20* (2006.01)
*B60K 1/04* (2019.01)
*B62D 29/00* (2006.01)

(52) U.S. Cl.
CPC ............. *B62D 21/152* (2013.01); *B60K 1/04* (2013.01); *B62D 21/157* (2013.01); *B62D 25/2018* (2013.01); *B62D 25/2036* (2013.01); *B60K 2001/0438* (2013.01); *B60Y 2306/01* (2013.01); *B62D 29/008* (2013.01)

(58) Field of Classification Search
CPC .............. B62D 21/152; B62D 25/2018; B62D 29/008; B60K 1/04; B60K 2001/0438
See application file for complete search history.

(56) References Cited

U.S. PATENT DOCUMENTS 9,937,781 B1 * 4/2018 Bryer ....................... B60K 1/04

FOREIGN PATENT DOCUMENTS

| JP | H07-117730 A | 5/1995 |
| JP | 2008-174181 A | 7/2008 |
| JP | 2014-080116 A | 5/2014 |

* cited by examiner

*Primary Examiner* — Lori L Lyjak
(74) *Attorney, Agent, or Firm* — Oliff PLC

(57) ABSTRACT

A vehicle body lower section structure including a battery pack and a pair of rockers is provided. The battery pack is mounted at a vehicle lower side of a floor panel of a vehicle. The pair of rockers are respectively disposed at two outer sides of the floor panel in a vehicle width direction. Each of the rockers extends along a vehicle front-rear direction and is configured with a profile when sectioned along the vehicle width direction that is a closed cross-section profile. Inside each rocker, an impact absorbing section is disposed at a position overlapping with the battery pack in vehicle side view so as to span along the vehicle width direction between an outer wall and an inner wall of the rocker, and a join section is provided at the impact absorbing section, joining the battery pack to the rocker.

3 Claims, 5 Drawing Sheets

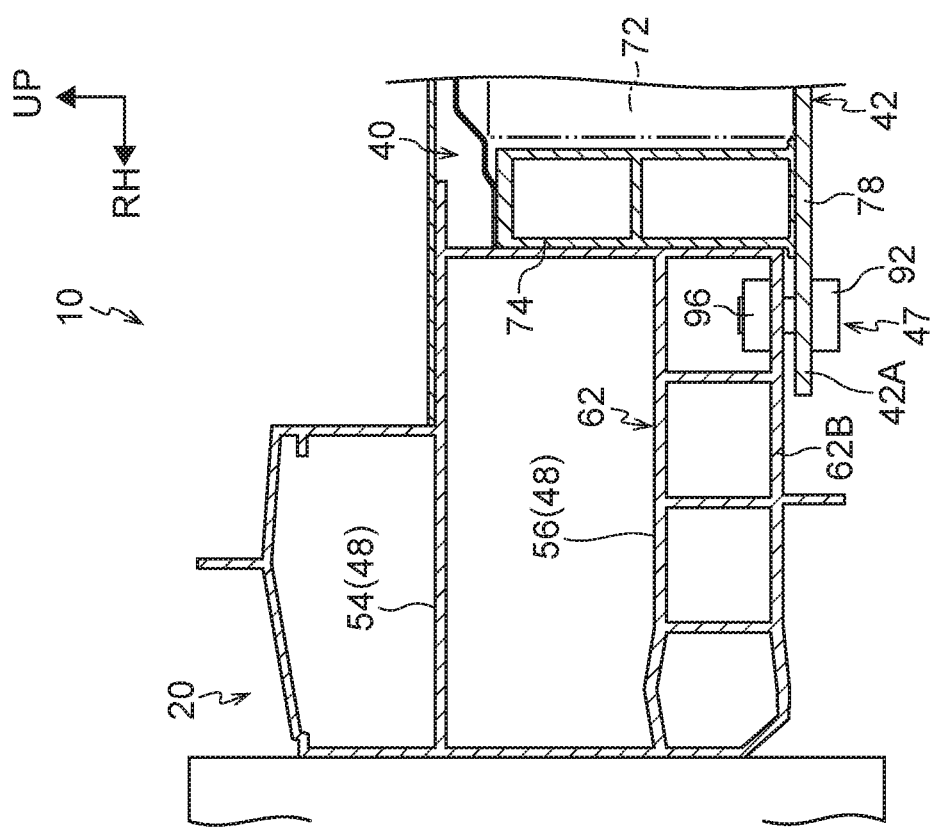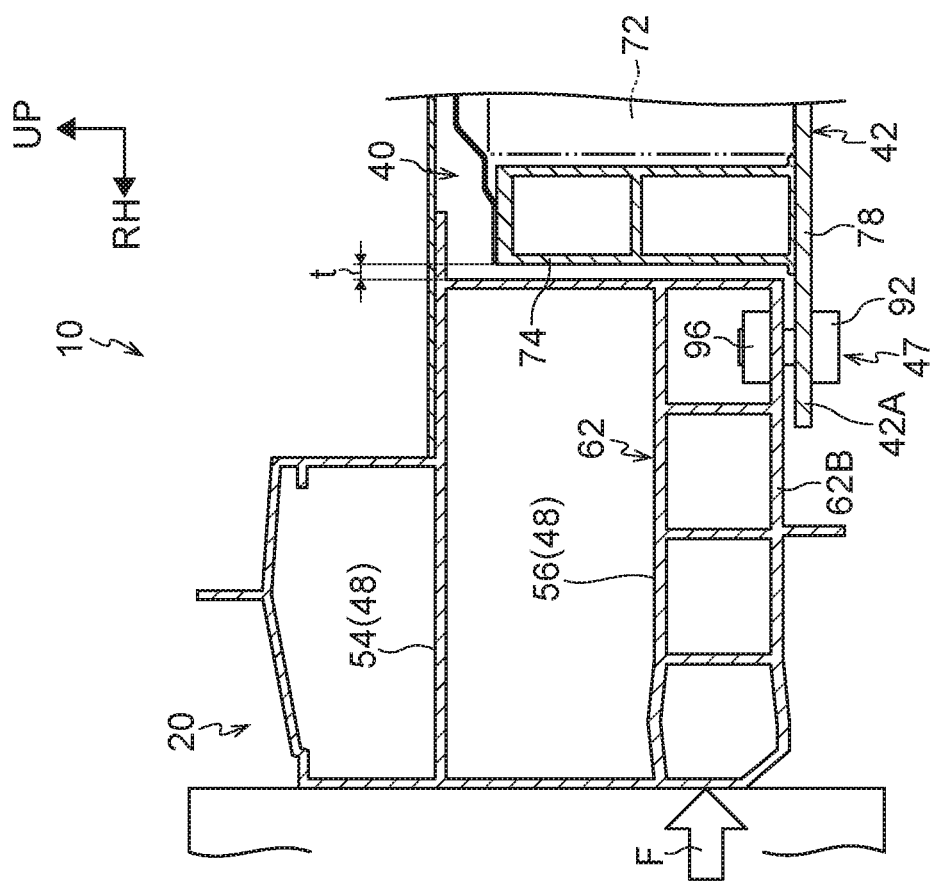

VEHICLE BODY LOWER SECTION STRUCTURE

CROSS-REFERENCE TO RELATED APPLICATION

This application claims priority under 35 USC 119 from Japanese Patent application No. 2017-125067 filed on Jun. 27, 2017, the disclosure of which is incorporated by reference herein in its entirety.

BACKGROUND

Technical Field

The present disclosure relates to a vehicle body lower section structure.

Related Art

Japanese Patent Application Laid-Open (JP-A) No. H07-117730 discloses technology for a floor structure of an electric car, in which side members are provided at lower faces of two side portions of a floor panel in a vehicle width direction, side sills (referred to as "rockers" hereafter) are provided at side edges of the floor panel, and the rockers and the side members are coupled together by outriggers.

In JP-A No. H07-117730, a side frame configuring part of a battery frame (referred to as a "battery pack" hereafter) mounted with plural batteries is attached to a lower side of the side members. A support member is provided at an inner wall positioned at the vehicle width direction inner side of each side frame, and extends at the inner face side of the side member, and faces toward outer faces of adjacent batteries in the battery pack.

Accordingly, in the technology of JP-A No. H07-117730, when impact load is input to one of the rockers in a crash involving side-face impact to the vehicle (hereafter, "in a vehicle side-impact crash"), the impact load is transmitted to the battery pack from the support member provided at the side frame, through the outrigger and the side member. Moreover, a reaction force from the battery pack is thereby obtained, the outrigger and the rocker are crushed and deformed efficiently, thereby absorbing impact energy.

However, as described above, in the technology of JP-A No. H07-117730, impact energy is absorbed by crushing and deforming the rocker and the outrigger. Namely, in order to absorb impact energy, a space (stroke) is required for installing the outrigger, as well as for installing the rocker. In cases in which space for installing the outrigger cannot be secured due to increased battery pack size, a stroke for absorbing the impact energy is not secured, with the possibility arising that impact energy is not adequately absorbed.

SUMMARY

The present disclosure obtains a vehicle body lower section structure capable of securing a degree of impact energy absorption when a stroke to absorb impact energy is short.

A vehicle body lower section structure according to a first aspect of the present disclosure includes a battery pack and a pair of rockers. The battery pack is mounted at a vehicle lower side of a floor panel of a vehicle. The pair of rockers are respectively disposed at two outer sides of the floor panel in a vehicle width direction. Each of the rockers extends along a vehicle front-rear direction and is configured with a profile when sectioned along the vehicle width direction that is a closed cross-section profile. Inside each rocker, an impact absorbing section is disposed at a position overlapping with the battery pack in vehicle side view so as to span along the vehicle width direction between an outer wall and an inner wall of the rocker, and a join section is provided at the impact absorbing section, joining the battery pack to the rocker.

In the first aspect, the battery pack is mounted at a vehicle lower side of a floor panel of a vehicle, and the pair of rockers are respectively disposed at the two vehicle width direction outer sides of the floor panel. The rockers each extend along the vehicle front-rear direction and each has a profile when sectioned along the vehicle width direction that is a closed cross-section profile.

Inside each rocker, an impact absorbing section spans along the vehicle width direction between the outer wall and the inner wall of the rocker at a position overlapping with the battery pack in vehicle side view. In this manner, a load transmission path is secured by providing the impact absorbing section inside each of the rockers so as to span between the outer wall and the inner wall. The join section is provided at the impact absorbing section to join the battery pack to the rocker. Namely, due to the join section being provided on the load transmission path of each of the rockers, impact load input to the rocker in a vehicle side-impact crash is immediately transmitted to the battery pack through the impact absorbing section and the join section.

However, in cases in which a gap is provided between the rocker and the battery pack, an idle travel time is created when the impact load input to the rocker is not being transmitted to the battery pack. Since no reaction force can be obtained from the battery pack in the idle travel time, the rocker would elastically deform (undergo bending deformation) toward the vehicle width direction inner side, such that impact energy is not able to be absorbed adequately by the rocker.

In contrast thereto, in the first aspect, the join section is provided at the impact absorbing section to connect the battery pack to the rocker. Thus, even when a gap is provided between the rocker and the battery pack, a load transmission path is still secured through the join section. Thus, impact load input to the rocker in a vehicle side-impact crash can be immediately transmitted to the battery pack through the impact absorbing section and the join section. This enables the rocker to immediately obtain a reaction force from the battery pack.

Thus, in the first aspect, bending deformation of the rocker toward the vehicle width direction inner side can be suppressed. Namely, the rocker can be suppressed from moving away, enabling the rocker to be reliably deformed plastically, and a degree of impact energy absorption to be secured. "Joining" encompasses joining by fastening with bolts or rivets, and also welding or the like.

A second aspect of the present disclosure is the vehicle body lower section structure of the first aspect, wherein the impact absorbing section is provided at a lower portion of each rocker, the battery pack includes a box shaped battery case, and a joining flange is provided at the battery case. The joining flange juts out from a bottom plate of the battery case toward the vehicle width direction outward and is joined to lower walls of the rockers.

In the second aspect, the impact absorbing section is provided at the lower portion of each of the rockers, and the battery pack includes the box shaped battery case. In the battery case, the joining flange juts out from the bottom plate of the battery case toward the vehicle width direction outer sides, and the joining flange is joined to the lower walls of the rockers.

Namely, due to the battery case configuring a box shape and the joining flange jutting out from the bottom plate of the battery case and being joined to the lower walls of the rockers, the outer walls configuring the outside of the rockers in the vehicle width direction, the inner walls configuring the inside of the rockers in the vehicle width direction, and the peripheral walls of the battery case are each disposed so as to face along the vehicle width direction. Accordingly, when the rocker deforms plastically in the vehicle width direction in a vehicle side-impact crash, a load transmission path to transmit load from the rocker to the battery pack is secured even if the rocker is slightly displaced in the vehicle vertical direction.

A third aspect of the present disclosure is the vehicle body lower section structure of the second aspect, wherein a cross member is provided at the battery case so as to span between a pair of peripheral walls that face each other along the vehicle width direction at a position overlapping with the impact absorbing section in vehicle side view.

In the third aspect, inside the battery case, the cross member spans between the pair of peripheral walls of the battery case that face each other along the vehicle width direction, and the cross member is provided at a position overlapping with the impact absorbing sections provided at the rockers in vehicle side view.

Due to providing the cross member to the battery case so as to span between the pair of side walls in this manner, the rigidity of the battery case itself can be raised. Moreover, the cross member inside the battery case is provided at a position overlapping with the impact absorbing section of the rocker in vehicle side view. Thus, when impact load is input to the rocker in a vehicle side-impact crash, a higher reaction force can be obtained than in cases in which the cross member is not provided inside the battery case. This thereby enables the impact absorbing section to be deformed plastically in an efficient manner.

As explained above, the vehicle body lower section structure according to the first aspect enables a degree of impact energy absorption to be secured even when the stroke to absorb impact energy is short.

The second aspect enables a load transmission path for transmission from the rocker to the battery pack to be secured.

The third aspect enables the impact absorbing section to be deformed plastically in an efficient manner.

BRIEF DESCRIPTION OF THE DRAWINGS

Exemplary embodiments of the present disclosure will be described in detail based on the following figures, wherein:

FIG. 4A is a cross-section illustrating a state in a vehicle side-impact crash, in order to explain operation of a vehicle body lower section structure according to an exemplary embodiment;

FIG. 4B is a cross-section illustrating a state in a vehicle side-impact crash, in order to explain operation of a vehicle body lower section structure according to an exemplary embodiment;

DETAILED DESCRIPTION

Figure 1:
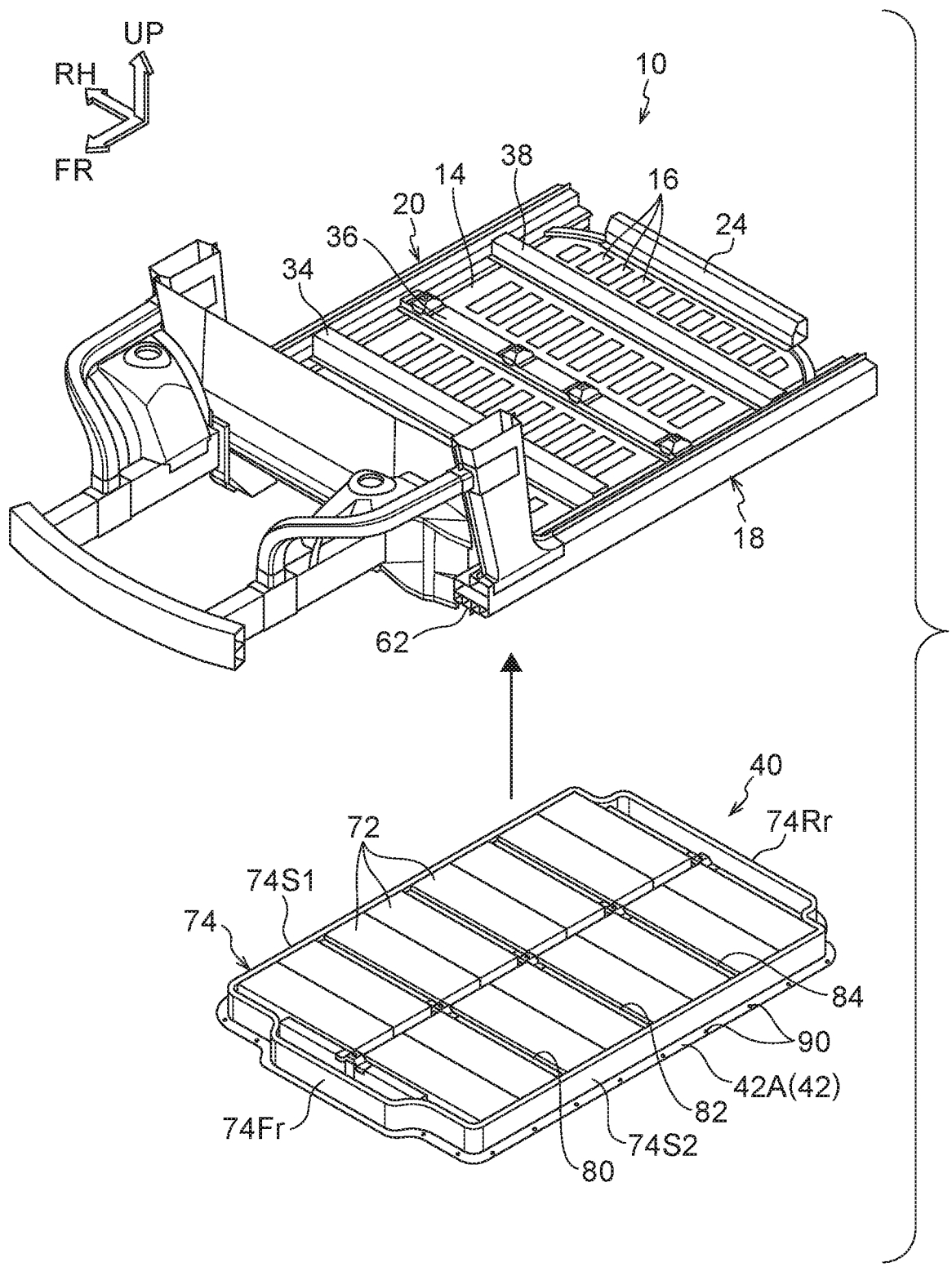
FIG. 1 is an exploded perspective view illustrating configuration of a vehicle body lower section structure according to an exemplary embodiment.

Explanation follows regarding a vehicle body 10 of an electric car applied with a vehicle body lower section structure according to an exemplary embodiment of the present disclosure, with reference to the drawings. Note that in each of the drawings, the arrow FR, the arrow UP, the arrow LH, and the arrow RH respectively indicate the front direction (direction of travel), upward direction, left direction, and right direction of the vehicle. In the following explanation, unless specifically stated otherwise, reference simply to the front and rear, left and right, and upward and downward directions refers to the front and rear in the vehicle front-rear direction, left and right in a vehicle width direction (vehicle width direction), and upward and downward in a vehicle vertical direction. In the interests of simplicity, some reference numerals may be omitted from the drawings.

Vehicle Body Lower Section Structure Configuration

First, explanation follows regarding configuration of the vehicle body lower section structure according to the present exemplary embodiment.

Figure 2:
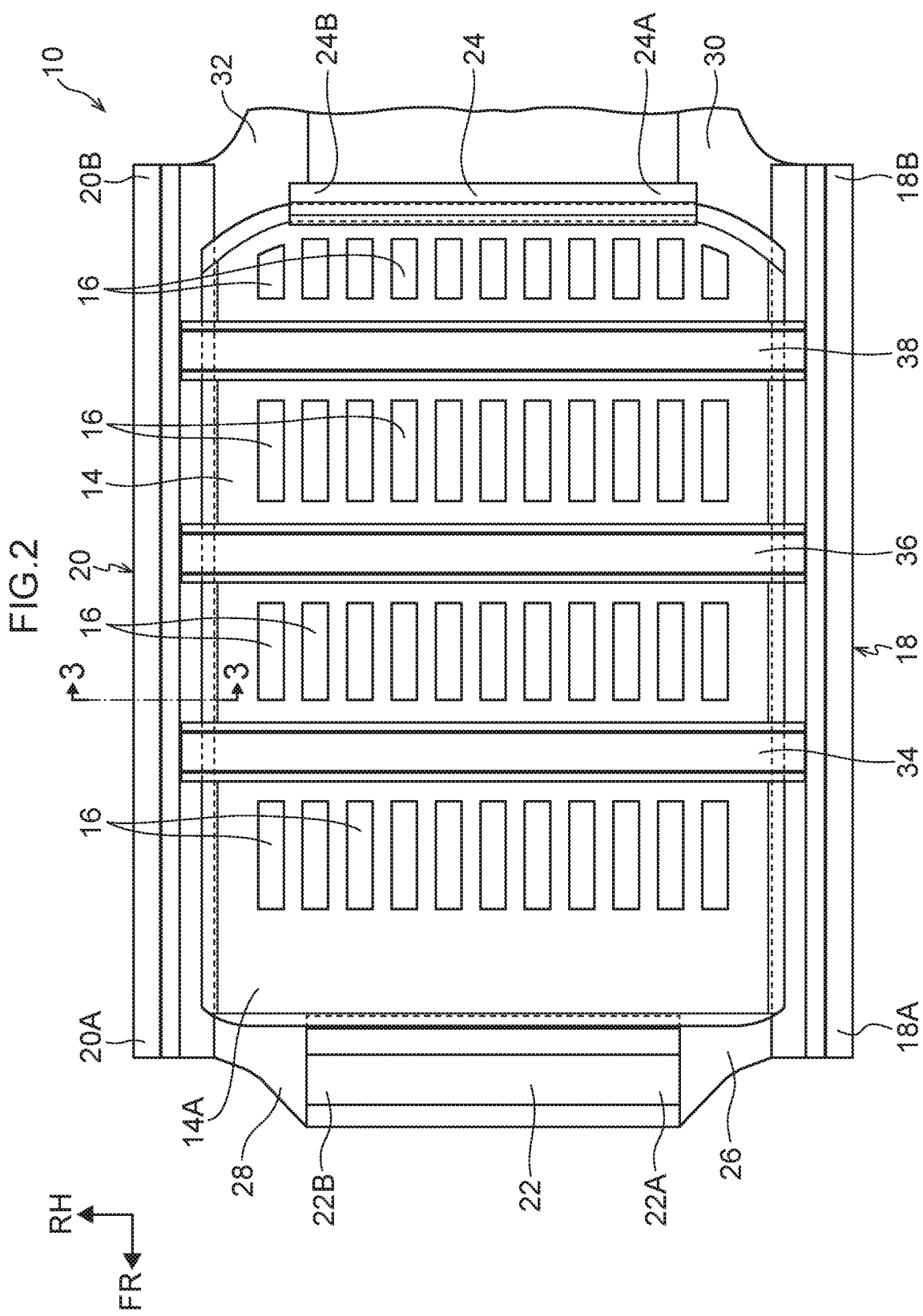
FIG. 2 is a plan view illustrating relevant portions of a vehicle body lower section structure according to an exemplary embodiment.

As illustrated in FIG. 2, in the vehicle body 10 according to the present exemplary embodiment, a floor panel 14, configuring a floor section of a vehicle cabin 12, extends along the vehicle width direction and the vehicle front-rear direction. Projecting bead portions 16 are intermittently provided along the vehicle front-rear direction of the floor panel 14. The projecting bead portions 16 each has a substantially rectangular profile in plan view. Plural of the bead portions 16 are arranged along the vehicle width direction. The rigidity of the floor panel 14 itself is raised by forming the bead portions 16.

Rockers 18, 20 respectively extend along the vehicle front-rear direction at each of the two vehicle width direction outer sides of the floor panel 14. Moreover, a front cross member 22 extends along the vehicle width direction at a front end portion 14A of the floor panel 14, and a rear cross member 24 extends along the vehicle width direction at a rear end portion 14B of the floor panel 14.

Coupling members 26, 28 are coupled to end portions 22A, 22B of the front cross member 22, and the front cross member 22 is coupled to front end portions 18A, 20A of the respective rockers 18, 20 through the coupling members 26, 28. Moreover, coupling members 30, 32 are coupled to end portions 24A, 24B of the rear cross member 24, and the rear cross member 24 is coupled to rear end portions 18B, 20B of the respective rockers 18, 20 through the coupling members 30, 32.

Note that the coupling members 26, 28, 30, and 32 are not always necessary, and obviously the front cross member 22 and the rear cross member 24 may be formed such that the two end portions 22A, 22B of the front cross member 22 and the two end portions 24A, 24B of the rear cross member 24 couple directly to the respective rockers 18, 20.

Above the floor panel 14 and between the front cross member 22 and the rear cross member 24 there are plural floor cross members 34, 36, 38 that span in the vehicle width direction between the rocker 18 and the rocker 20. Note that the floor cross members 34, 36, 38 are each disposed between pairs of bead portions 16 disposed adjacent to each other in the vehicle front-rear direction.

Figure 3:
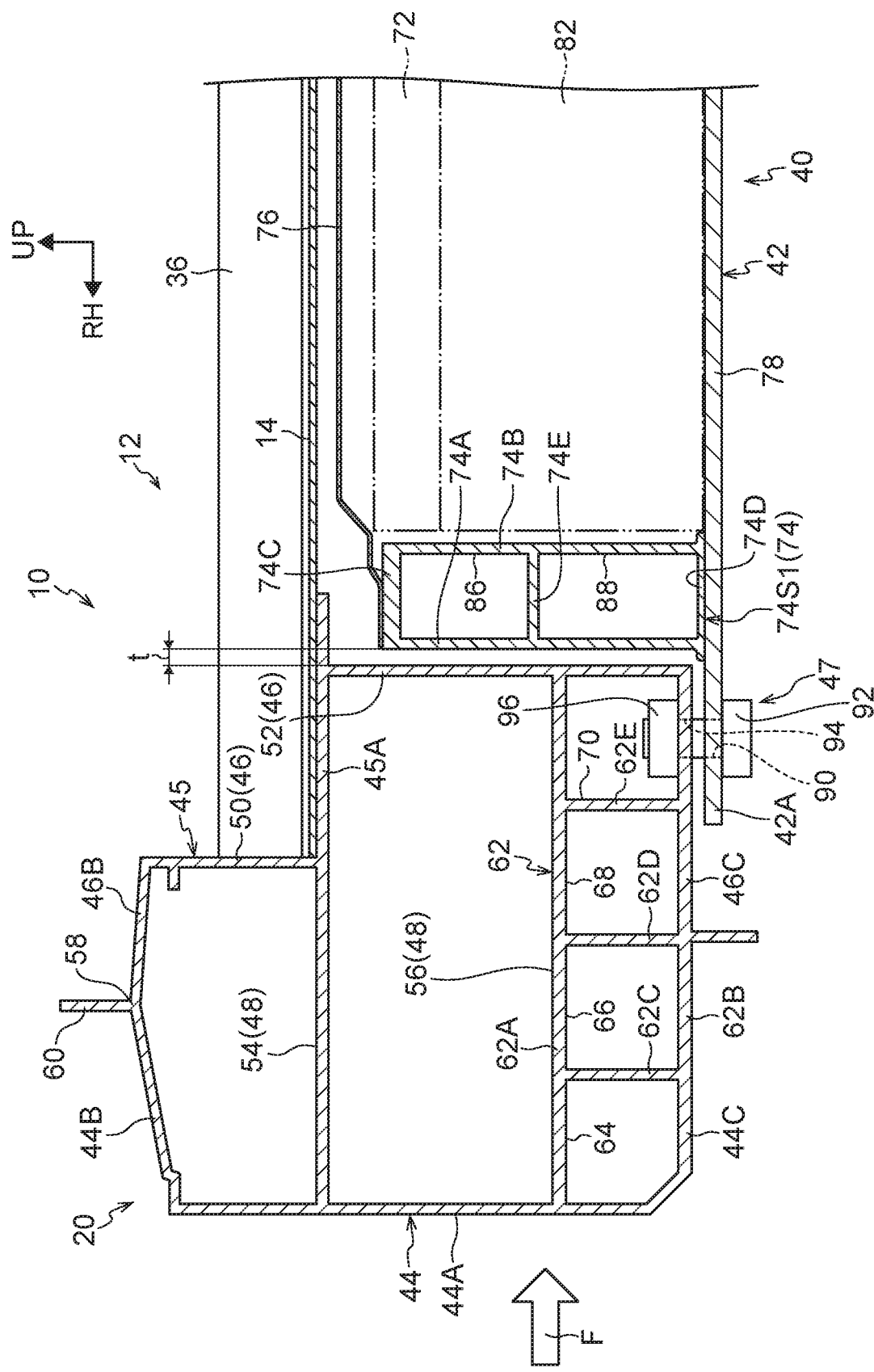
FIG. 3 is an enlarged cross-section illustrating an enlargement of a plane sectioned along line 3-3 in FIG. 2.

As illustrated in FIG. 1 and FIG. 3, a battery pack 40 for supplying electrical power to a power unit such as a motor is installed below the floor panel 14. The battery pack 40 is formed in a flattened, substantially cuboidal shape, and is mounted below substantially the entire floor of the vehicle cabin 12. The battery pack 40 is disposed between the pair of left and right rockers 18, 20, and between the front cross member 22 and the rear cross member 24. Note that the rockers 18, 20, the front cross member 22, and the rear cross member 24 all configure framework of the vehicle body 10.

First, explanation follows regarding configuration of the rockers 18, 20, followed by explanation regarding configuration of the battery pack 40, and then explanation regarding a join section 47, this being a relevant portion of the present exemplary embodiment.

Rocker Configuration

As described above, the rockers 18, 20 respectively extend along the vehicle front-rear direction at each of the two vehicle width direction ends of the floor panel 14. Note that the rocker 18 has substantially the same configuration as the rocker 20, and so explanation regarding the rocker 18 will be omitted.

As illustrated in FIG. 3, in the present exemplary embodiment, the rocker 20 is configured including an outer section 44 positioned on the vehicle width direction outer side, and an inner section 45 positioned on the vehicle width direction inner side. The rocker 20 is, for example, formed from a metal such as an aluminum alloy, with the outer section 44 and the inner section 45 being integrally formed by extrusion, drawing, or the like. A closed cross-section portion 48 is formed by the outer section 44 and the inner section 45.

The cross-section profile of the outer section 44 as sectioned along the vehicle width direction is configured including an outer wall 44A, an inclined upper wall 44B, and a lower wall 44C. The outer wall 44A is formed along the vertical direction. The inclined upper wall 44B is provided at the upper side of the outer wall 44A and inclines toward the upper side on progression toward the vehicle width direction inner side. The lower wall 44C is provided at the lower side of the outer wall 44A and is formed running along a substantially horizontal direction toward the vehicle width direction inner side.

The cross-section profile of the inner section 45 as sectioned along the vehicle width direction is configured by an inner wall 46 including an upper inner wall 50, and a lower inner wall 52, that are formed along the vertical direction. The upper inner wall 50 is formed at an upper portion of the inner section 45. The lower inner wall 52 is formed at a lower portion of the inner section 45. The lower inner wall 52 is positioned further toward the vehicle width direction inner side than the upper inner wall 50. A lateral wall 45A formed substantially along the horizontal direction is provided between the lower inner wall 52 and the upper inner wall 50.

The lateral wall 45A links the lower inner wall 52 and the upper inner wall 50 together, such that the inner wall 46 of the inner section 45 is formed in a crank shape. Moreover, the lateral wall 45A extends as far as the outer wall 44A of the outer section 44. The closed cross-section portion 48 configuring the interior of the rocker 20 is partitioned into an upper space 54 and a lower space 56 by the lateral wall 45A.

An inclined upper wall 46B is provided above the upper inner wall 50, and inclines upward on progression toward the vehicle width direction outer side. The inclined upper wall 46B is formed so as to be linked to the inclined upper wall 44B of the outer section 44. A flange 60 extends upward from an apex portion 58 where the inclined upper wall 46B of the inner section 45 and the inclined upper wall 44B of the outer section 44 are linked together. Note that a lower end portion of a non-illustrated pillar is joined to the flange 60. A lower wall 46C, serving as part of a join section, is provided at the lower side of the lower inner wall 52 and is formed running substantially along the horizontal direction toward the vehicle width direction outer side. The lower wall 46C is formed so as to be linked to the lower wall 44C of the outer section 44.

As described above, the closed cross-section portion 48 is formed inside the rocker 20, and the closed cross-section portion 48 is partitioned into the upper space 54 and the lower space 56. In addition, a ladder-shaped impact absorbing section 62 is provided in the lower space 56. The impact absorbing section 62 spans between the outer wall 44A in the outer section 44 and the inner wall 46 in the inner section 45 of the rocker 20, at a position overlapping with the battery pack 40 in vehicle side view.

The impact absorbing section 62 is configured including an upper wall 62A and a lower wall 62B. The upper wall 62A configures an upper portion of the impact absorbing section 62, and is formed along a substantially horizontal direction between the outer wall 44A of the outer section 44 and the inner wall 46 of the inner section 45. The lower wall 62B configures a lower portion of the impact absorbing section 62, and is formed running substantially parallel to the upper wall 62A. Note that the lower wall 62B is configured by a lower wall 62B that is part of the outer section 44 and a lower wall 62B that is part of the inner section 45.

Plural (in this case, three) coupling walls 62C, 62D, 62E spanning in the vertical direction between the upper wall 62A and the lower wall 62B are disposed at uniform intervals along the vehicle width direction. The impact absorbing section 62 is thus provided with small spaces 64, 66, 68, 70.

Battery Pack Configuration

As illustrated in FIG. 1 and FIG. 3, the battery pack 40 includes a battery case 42 and plural battery modules 72. The battery case 42 is formed in a box shape having a length along the vehicle front-rear direction and flattened in the vehicle vertical direction. The battery modules 72 are housed within the battery case 42. The battery modules 72 are configured by plural storage batteries that are rectangular in plan view.

The battery case 42 includes a peripheral wall 74, a top plate (lid) 76 (omitted from illustration in FIG. 1), and a bottom plate 78. The peripheral wall 74 is formed by extrusion molding a light metal such as an aluminum alloy into an elongated extrusion molded component, bending this into a rectangular frame shape, and joining the two length direction end portions of the peripheral wall 74 together to form a rectangular frame shape in plan view.

As illustrated in FIG. 1, the peripheral wall 74 is configured including a pair of left and right side walls 74S1, 74S2 that face each other along the vehicle width direction, a front wall 74Fr that links front ends of the side wall 74S1 and the side wall 74S2 together, and a rear wall 74Rr that links rear ends of the side wall 74S1 and the side wall 74S2 together. The side wall 74S1 and the side wall 74S2 face each other along the vehicle front-rear direction. Cross members 80, 82, 84 span between the side wall 74S1 and the side wall 74S2. The cross members 80, 82, 84 are disposed at uniform intervals between the front wall 74Fr and the rear wall 74Rr.

As illustrated in FIG. 3, the peripheral wall 74 of the battery case 42 is formed with a substantially B-shaped cross-section profile as viewed along the peripheral direction (length direction of the extrusion molded component). The peripheral wall 74 includes an outer peripheral wall 74A forming an outer peripheral face of the peripheral wall 74, an inner peripheral wall 74B forming an inner peripheral face of the peripheral wall 74, an upper wall 74C linking upper end portions of the outer peripheral wall 74A and the inner peripheral wall 74B together in the vehicle horizontal direction, a lower wall 74D linking lower end portions of the outer peripheral wall 74A and the inner peripheral wall 74B together in the vehicle horizontal direction, and a partitioning wall 74E linking vertical direction intermediate portions of the outer peripheral wall 74A and the inner peripheral wall 74B together in the vehicle horizontal direction. The interior of the peripheral wall 74 is partitioned into an upper space 86 and a lower space 88 by the partitioning wall 74E.

The top plate 76 is, for example, formed by press molding a plate material configured from a light metal such as an aluminum alloy, and is fixed to an upper face of the upper wall 74C of the peripheral wall 74 by plural bolts (not illustrated in the drawings). The bottom plate 78 is, for example, formed by press molding a plate material configured from a light metal such as an aluminum alloy, and is fixed to a lower face of the lower wall 74D of the peripheral wall 74 by welding, riveting, or the like. As illustrated in FIG. 1 and FIG. 3, a joining flange 42A is provided at the bottom plate 78 so as to jut out further in the vehicle horizontal direction than the peripheral wall 74 toward the vehicle outer side, around the entire preferably of the peripheral wall 74.

Explanation follows regarding the join section 47. As illustrated in FIG. 3, the join section 47 is configured including the joining flange 42A (join section) jutting out from the bottom plate 78 of the battery case 42. The joining flange 42A is in a state of superposition with the lower face of the lower wall 46C (join section) of the rocker 20. As illustrated in FIG. 1, plural bolt holes 90 are formed along the peripheral wall 74 through the joining flange 42A.

As illustrated in FIG. 3, bolts 92 (join section) are inserted through the bolt holes 90 from the vehicle lower side. Each bolt 92 is inserted through a bolt hole 94 formed in the lower wall 46C of the rocker 20, and is screwed together with a weld nut 96 (join section) disposed in the small space 70 of the impact absorbing section 62 provided in the lower space 56 of the rocker 20.

The joining flange 42A jutting out from the bottom plate 78 is thus fastened together with (joined to) the left and right rockers 18 (see FIG. 2), 20 so as to fix the battery case 42, namely the battery pack 40, to the rockers 18, 20 in a state supported from the lower side by the bottom plate 78.

Note that the joining flange 42A does not necessarily need to be formed around the entire periphery of the peripheral wall 74, as long as it is formed at the peripheral wall 74 of the battery case 42 at least at the side wall 74S1, 74S2 sides thereof.

Vehicle Body Lower Section Structure Operation

Next, explanation follows regarding operation of the vehicle body lower section structure according to the present exemplary embodiment.

As illustrated in FIG. 3, in the present exemplary embodiment, inside the rocker 20, the impact absorbing section 62 spans in the vehicle width direction between the outer wall 44A of the outer section 44 and the inner wall 46 of the inner section 45 of the rocker 20 at a position overlapping with the battery pack 40 in vehicle side view. Providing the impact absorbing section 62 spanning between the outer wall 44A and the inner wall 46 thereby secures a load transmission path inside the rocker 20. The joining flange 42A that joins the battery pack 40 to the rocker 20 is joined to the lower wall 62B of the impact absorbing section 62.

Namely, in the present exemplary embodiment, due to the joining flange 42A being joined on the load transmission path through the rocker 20, in a vehicle side-impact crash (and in particular, in a side-impact crash with a pole), impact load F input to the rocker 20 is immediately transmitted to the battery pack 40 through the impact absorbing section 62 and the joining flange 42A. Note that the rocker 18 illustrated in FIG. 2 operates in a similar manner to the rocker 20.

Figure 5B:
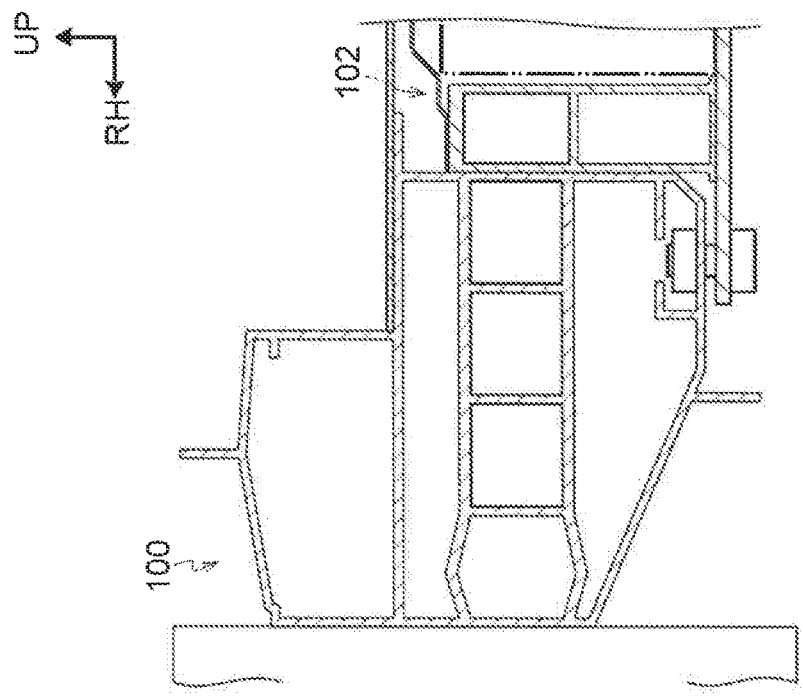
FIG. 5B is a cross-section illustrating a state in a vehicle side-impact crash, in order to explain operation of a comparative example.
Figure 5A:
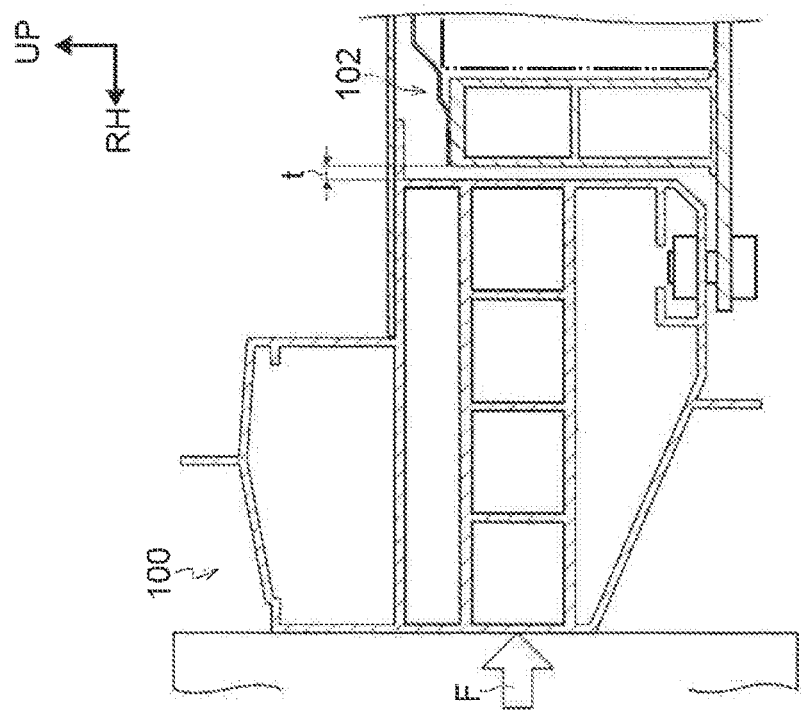
FIG. 5A is a cross-section illustrating a state in a vehicle side-impact crash, in order to explain operation of a comparative example.

For example, as illustrated in a comparative example in FIG. 5A, in a case having a gap t provided between a rocker 100 and a battery pack 102, as illustrated schematically in FIG. 5B, the time until the rocker 100 makes contact with the battery pack 102 is idle travel time. Namely, due to the presence of the gap t, idle travel time is created in which the impact load F input to the rocker 100 is not being transmitted to the battery pack 102. Since no reaction force can be obtained from the battery pack 102 in the idle travel time, the rocker 100 elastically deforms (undergo bending deformation) toward the vehicle width direction inner side, such that impact energy is not able to be adequately absorbed by the rocker 100.

By contrast, in the present exemplary embodiment, as illustrated in FIG. 3, the joining flange 42A that joins the battery pack 40 to the rocker 20 is joined to the lower wall 62B of the impact absorbing section 62. Accordingly, even when a gap t is provided between the rocker 20 and the battery pack 40, a load transmission path through the join section 47 is still secured.

Accordingly, as illustrated in FIG. 4A, the impact load F input to the rocker 20 in a vehicle side-impact crash is immediately transmitted to the battery pack 40 through the impact absorbing section 62 and the join section 47, as schematically illustrated in FIG. 4B. This thereby enables the rocker 20 to immediately obtain a reaction force from the battery pack 40.

Due to providing the impact absorbing section 62 inside the rocker 20 as described above, impact energy absorption can be improved by the impact absorbing section 62 deforming plastically. Moreover, in the present exemplary embodiment, the join section 47 that joins the battery pack 40 to the rocker 20 is provided at the impact absorbing section 62.

Accordingly, in the present exemplary embodiment, the rocker 20 is capable of immediately obtaining a reaction force from the battery pack 40 in a vehicle side-impact crash, thereby suppressing bending deformation of the rocker 20 toward the vehicle width direction inside. Namely, the rocker 20 is suppressed from moving away, enabling the rocker 20 to be reliably deformed plastically, and enabling a degree of impact energy absorption to be secured. Accordingly, in the present exemplary embodiment, a degree of impact energy absorption can be secured even when the stroke to absorb impact energy is short.

Moreover, in the present exemplary embodiment, as illustrated in FIG. 3, the impact absorbing section 62 is provided at a lower portion of the rocker 20 (on the lower space 56 side), and as illustrated in FIG. 1, the battery pack 40 is provided with the box shaped battery case 42. As illustrated in FIG. 1 and FIG. 3, the joining flange 42A on the battery case 42 juts out from the bottom plate 78 (not illustrated in FIG. 1) of the battery case 42 toward the vehicle width direction outer side, and the joining flange 42A is joined to the lower wall 62B of the impact absorbing section 62.

Namely, since the battery case 42 configures a box shape, and the joining flange 42A jutting out from the bottom plate 78 of the battery case 42 is joined to the lower wall 62B of the rocker 20, the outer wall 44A of the rocker 20, the inner wall 46 of the rocker 20, and the peripheral wall 74 of the battery case 42 are each disposed so as to face along the vehicle width direction. Accordingly, when the rocker 20 deforms plastically in the vehicle width direction in a vehicle side-impact crash, a load transmission path from the rocker 20 to the battery pack 40 is secured even if the rocker 20 is slightly displaced in the vehicle vertical direction.

Moreover, as illustrated in FIG. 1, in the first exemplary embodiment the cross members 80, 82, 84 span between the pair of left and right side walls 74S1, 74S2 of the battery case 42 that face each other along the vehicle width direction inside the battery case 42. The cross members 80, 82, 84 are provided at positions overlapping with the impact absorbing section 62 provided at the rocker 20 in vehicle side view.

Providing the cross members 80, 82, 84 inside the battery case 42 so as to span between the pair of side walls 74S1, 74S2 in this manner enables the rigidity of the battery case 42 itself to be raised. Moreover, the cross members 80, 82, 84 in the battery case 42 are provided at positions overlapping with the impact absorbing section 62 of the rocker 20 in vehicle side view, such that when impact load is input to the rocker 20 in a vehicle side-impact crash, a higher reaction force can be obtained than in cases in which the cross members 80, 82, 84 are not provided inside the battery case 42. This thereby suppresses bending deformation of the rocker 20 toward the vehicle width direction inner side, and enables the impact absorbing section 62 to be deformed plastically in an efficient manner.

Explanation has been given regarding an example of an exemplary embodiment of the present disclosure. However, exemplary embodiments of the present disclosure are not limited to the above, and obviously the exemplary embodiment and various modified examples may be combined as appropriate, and various implementations are possible within a range not departing from the spirit of the present disclosure.

What is claimed is:

1. A vehicle body lower section structure comprising:
   a battery pack that is mounted at a vehicle lower side of a floor panel of a vehicle; and
   a pair of rockers that are respectively disposed at two outer sides of the floor panel in a vehicle width direction, that each extend along a vehicle front-rear direction, and that are each configured with a profile when sectioned along the vehicle width direction that is a closed cross-section profile,
   wherein, inside each rocker:
      an impact absorbing section is disposed at a position overlapping with the battery pack in vehicle side view so as to span along the vehicle width direction between an outer wall and an inner wall of the rocker, and
      a join section is provided at the impact absorbing section, joining the battery pack to the rocker.

2. The vehicle body lower section structure of claim 1, wherein:
   the impact absorbing section is provided at a lower portion of each rocker, and the battery pack includes a box shaped battery case, and
   a joining flange is provided at the battery case, the joining flange jutting out from a bottom plate of the battery case toward the vehicle width direction outward and being joined to lower walls of the rockers.

3. The vehicle body lower section structure of claim 2, wherein a cross member is provided at the battery case so as to span between a pair of peripheral walls that face each other along the vehicle width direction at a position overlapping with the impact absorbing section in vehicle side view.

* * * * *